(12) United States Patent
Saitou et al.

(10) Patent No.: US 7,300,243 B2
(45) Date of Patent: Nov. 27, 2007

(54) POWER BLOWER

(75) Inventors: Akito Saitou, Wako (JP); Tadayuki Yoneyama, Wako (JP); Toshiharu Nasuno, Wako (JP)

(73) Assignee: Honda Motor Co., Ltd., Japan ( * ) Notice: Subject to any disclaimer, the term of this patent is extended or adjusted under 35 U.S.C. 154(b) by 49 days.

(21) Appl. No.: 10/984,308

(22) Filed: Nov. 9, 2004

(65) Prior Publication Data
US 2005/0123393 A1 Jun. 9, 2005

(30) Foreign Application Priority Data
Dec. 5, 2003 (JP) ............... 2003-407461
Dec. 5, 2003 (JP) ............... 2003-407499

(51) Int. Cl.
*F04D 29/66* (2006.01)
(52) U.S. Cl. ........................... 415/119; 416/63
(58) Field of Classification Search ................ 415/119; 403/33; 416/63
See application file for complete search history.

(56) References Cited

U.S. PATENT DOCUMENTS 2,538,954 A * 1/1951 Efromson et al. ....... 267/141.3
3,637,029 A * 1/1972 Sherwood et al. ....... 173/162.2
4,674,146 A 6/1987 Tuggle et al. .............. 15/330
5,269,665 A * 12/1993 Sadler et al. ............... 417/363

FOREIGN PATENT DOCUMENTS

JP 06049865 3/1989

* cited by examiner

*Primary Examiner*—Richard A. Edgar
(74) *Attorney, Agent, or Firm*—Adams & Wilks

(57) ABSTRACT

A power blower has a fan housing, a blowing fan accommodated in the fan housing, a drive source for driving the blowing fan, an operating handle connected to the fan housing for gripping by an operator of the power blower, and at least one vibration damping member interposed between the operating handle and the fan housing. The vibration damping member has resiliently deformed protruding portions contacting an inner peripheral surface of the operating handle so that vibrations in three directions, passing from the drive source and blowing fan to the fan housing, are absorbed by resilient deformation of the protruding portions to thereby suppress vibrations passing via the fan housing to the operating handle.

20 Claims, 16 Drawing Sheets

FIG. 5
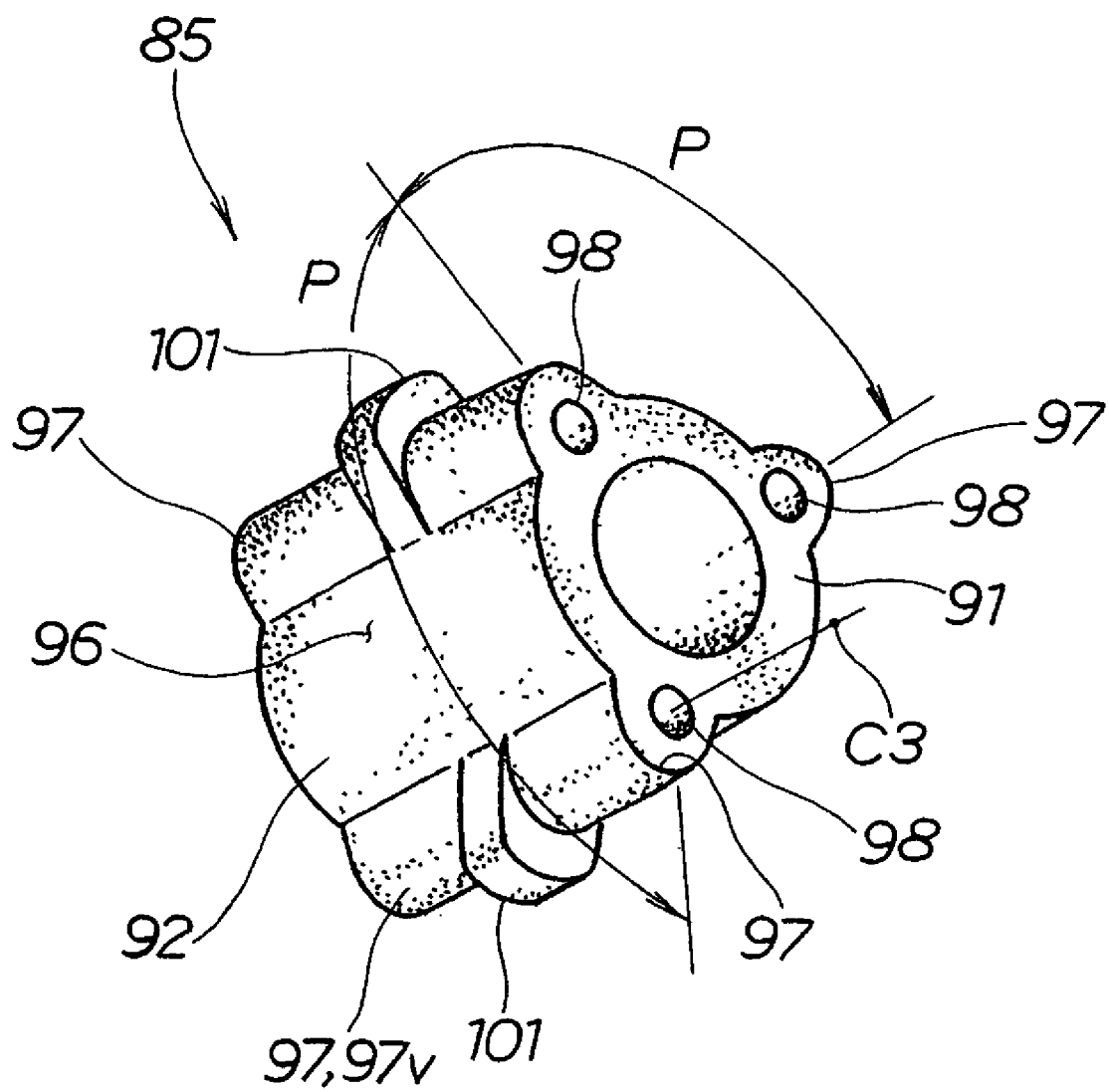
Y AXIS

POWER BLOWER

FIELD OF THE INVENTION

The present invention relates to an improved power blower capable of minimizing vibrations passing from a drive source, such as an engine, to an operating handle to be gripped by a human operator.

BACKGROUND OF THE INVENTION

In the field of hand-held or portable air blowers, vibration damping (i.e., anti-vibration) structures have been in practical use, where vibration damping members are interposed between an operating handle to be gripped by a human operator and a drive source, such as an engine, of the air blower. Among examples of the conventionally-known vibration damping structures is one that has rubber-made cylindrical vibration damping members interposed between various components in a hand-held or portable air blower (for example, Japanese Utility Model Publication No. HEI-6-49865).

FIG. 19 is a sectional view of the conventional vibration damping structure of the portable air blower 201 disclosed in the utility model publication, which comprises an engine (not shown), engine cover 202 and operating handle 203. Such a vibration damping structure is provided on front and rear portions of the operating handle 203 and located inwardly of the engine cover 202. As shown, the vibration damping structure, provided in each of the front and rear portions of the operating handle 203, includes a cylindrical vibration damping member 204 made of rubber and interposed between the handle 203 and the engine cover 202 (specifically, mounting seat 205 projecting from the cover 202). Coordinate axes X, Y and Z shown in a lower section of the figure indicate three mutually-perpendicular directions of linear movement; "X" represents a horizontal linear movement axis (perpendicular to the sheet of the figure), "Y" represents a vertical axis perpendicular to the X axis, and "Z" represents a horizontal axis perpendicular to both of the X and Y axes.

However, although each of the vibration damping members 204 in the air blower 201 can absorb vertical vibrations (i.e., vibrations in the Y-axis direction) and back-and-forth vibrations (i.e., vibrations in the X-axis direction) to thereby reduce the vibrations passing to the handle 203, it can not absorb left-and-right vibrations (i.e., vibrations in the Z-axis direction) due to interference by the mounting seat 205 and handle 203. Because of the left-and-right (i.e., Z-axis direction) vibrations passing to the operating handle 203, the vibration damping member 204 can not suppress the vibrations in all of the three (X-, Y- and Z-axis) directions.

The vibration damping structure in the air blower 201 is also disadvantageous in that it would take a considerable amount of time and labor to install the operating handle 203. Namely, for installation of the operating handle 203, the vibration damping members 204 are first passed through the two (i.e., front and rear) mounting seats 205 of the engine cover 202 in such a manner that the damping members 204 are fitted over and hence retained at their middle by the corresponding seats 205 against accidental detachment. Then, the handle halves of the operating handle 203 are fitted around the damping members 204. Such operations are very cumbersome and time consuming.

SUMMARY OF THE INVENTION

In view of the foregoing prior art problems, it is an object of the present invention to provide an improved power blower which can effectively absorb vibrations in three (i.e., X-, Y- and Z-axis) directions, produced by a drive source and air blowing fan, to thereby minimize vibrations passing to an operating handle of the blower, and where the operating handle can be assembled to a housing with increased ease.

In order to accomplish the above-mentioned object, the present invention provides an improved power blower, which comprises: a fan housing having an air discharge duct attached to an air discharge opening formed therein; a blowing fan accommodated in the fan housing; an operating handle; and a vibration damping mechanism, typically formed of rubber, via which the operating handle is fixed on the fan housing, the vibration damping mechanism resiliently supporting the operating handle in such a manner as to permit displacement of the handle with respect to the fan housing in three mutually-perpendicular directions: an axial direction of the air discharge duct; and two directions perpendicular to the axial direction of the air discharge duct.

With the vibration damping mechanism employed in the present invention, vibrations in the three mutually-perpendicular directions, passing from a drive source (such as an engine) and blowing fan to the fan housing, can be effectively absorbed, so that the vibrations passing via the fan housing to the operating handle can be minimized. Therefore, the vibration damping mechanism in the present invention may be called "three-direction vibration damping mechanism".

In an embodiment of the present invention, the vibration damping mechanism comprises a shaft section projecting provided on and from a surface of the fan housing, a cylindrical mounting section provided on the operating handle and located around the outer peripheral surface of the shaft section, and a resilient vibration damping member interposed between the cylindrical mounting section and the shaft section, and wherein the vibration damping member has a plurality of protruding portions contacting the inner peripheral surface of the cylindrical mounting section. Vibrations in the three directions, passing from the drive source and blowing fan to the fan housing, can be absorbed by resilient deformation of the protruding portions of the vibration damping member. Thus, in the present invention the vibrations passing via the fan housing to the operating handle can be suppressed even more effectively with a simple structure.

Further, in an embodiment, the vibration damping mechanism comprises: a support portion provided on and projecting from a surface of the fan housing, a shaft section projecting from a surface of the support portion; a resilient vibration damping member fitted over the shaft section and having one end surface abutting against a stepped surface formed in the shaft section; a mounting section formed on the operating handle and fitting over the outer peripheral surface of the vibration damping member without interfering with the shaft section; and a retainer member provided at a distal end of the shaft section for holding another end surface of the vibration damping member.

When the operating handle is to be installed on the fan housing, the resilient vibration damping member is first attached to the operating handle, and then the operating handle with the damping member attached thereto is fitted over the shaft section of the fan housing in one direction (i.e., from the distal end of the shaft section). Finally, the retainer member is secured to the shaft section. Namely, the operating handle with the damping member attached thereto can be fixed on the fan housing by just being fitted over the shaft section in the one direction. Thus, in the present invention, assembly, to the fan housing, of the handle can be carried out with increased ease and efficiency.

Further, because the vibration damping member fitted over the shaft section is retained between the stepped surface of the shaft section and the retainer member and the mounting section fits over the outer peripheral surface of the vibration damping member without interfering with the shaft section, the vibration damping mechanism, supporting the handle, can avoid interference between the shaft section and the mounting section of the handle when the vibration damping member functions to absorb vibrations of the shaft section. Thus, the vibration damping mechanism can effectively suppress vibrations passing from the drive source and cooling fan, via the fan housing, to the handle.

BRIEF DESCRIPTION OF THE DRAWINGS

Certain preferred embodiments of the present invention will hereinafter be described in detail, by way of example only, with reference to the accompanying drawings, in which:

FIG. 5 is a lower perspective view of a vibration damping member in the power blower of the present invention;

FIG. 10 is a front view of a drive source cover and FIG. 15 is a cross-sectional view taken along line 15—15 of FIG. 10;

DETAILED DESCRIPTION OF THE PREFERRED EMBODIMENTS

Figure 1:
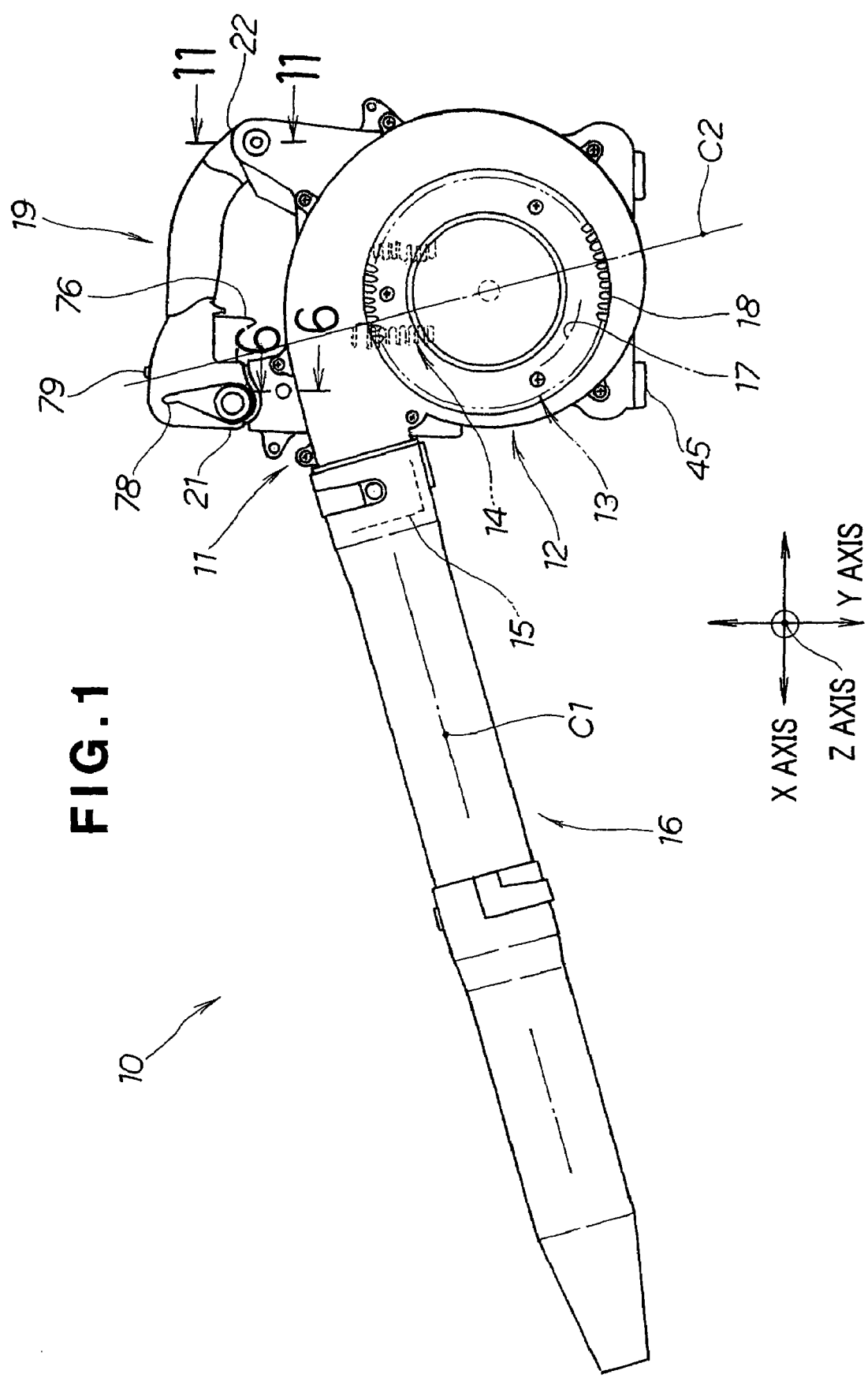
FIG. 1 is a left side view of a power blower in accordance with an embodiment of the present invention.

FIG. 1 is a left side view of a power blower in accordance with an embodiment of the present invention. The power blower 10 of the present invention is a portable-type air blower which includes a fan housing 12, an air blowing fan 13 accommodated in the fan housing 12, and a drive source 14, such as an engine, externally attached to the fan housing 12 for driving the blowing fan 13. The power blower 10 also includes an air discharge duct (air blowing pipe) 16 attached to an air discharge opening 15 formed in the fan housing 12 for discharging air from the interior of the housing 12, a fan cover 18 attached to an air suction opening 17 formed in the fan housing 12, an operating handle 19 having front and rear handle portions 21 and 22 and fixed on an upper end portion of the fan housing 12 for gripping by a human operator via a three-direction vibration damping mechanism to be detailed below.

The fan housing 12, blowing fan 13 and fan cover 18 together constitute an air blowing section 11 of the power blower 10. Reference character C1 represents an axial centerline of the discharge duct 16, and C2 represents a plane perpendicular to the axial centerline C1 of the discharge duct 16 (see also FIG. 3).

Coordinate axes X, Y and Z are shown in a lower section of the figure and indicate three mutually-perpendicular directions of possible movement or displacement of the operating handle 19; that is, "X" represents a horizontal axis extending in a front-and-rear direction of the power blower 10, "Y" represents a vertical axis extending perpendicularly to the X axis, and "Z" represents a horizontal axis extending in a left-and-right direction perpendicularly to both of the X and Y axes.

The plane C2 perpendicular to the axial centerline C1 of the discharge duct 16 often becomes a vertical plane depending on a state of use of the power blower 10. For description purposes, the plane C2 is assumed here to be the vertical plane that includes the Y and Z axes.

Figure 2:
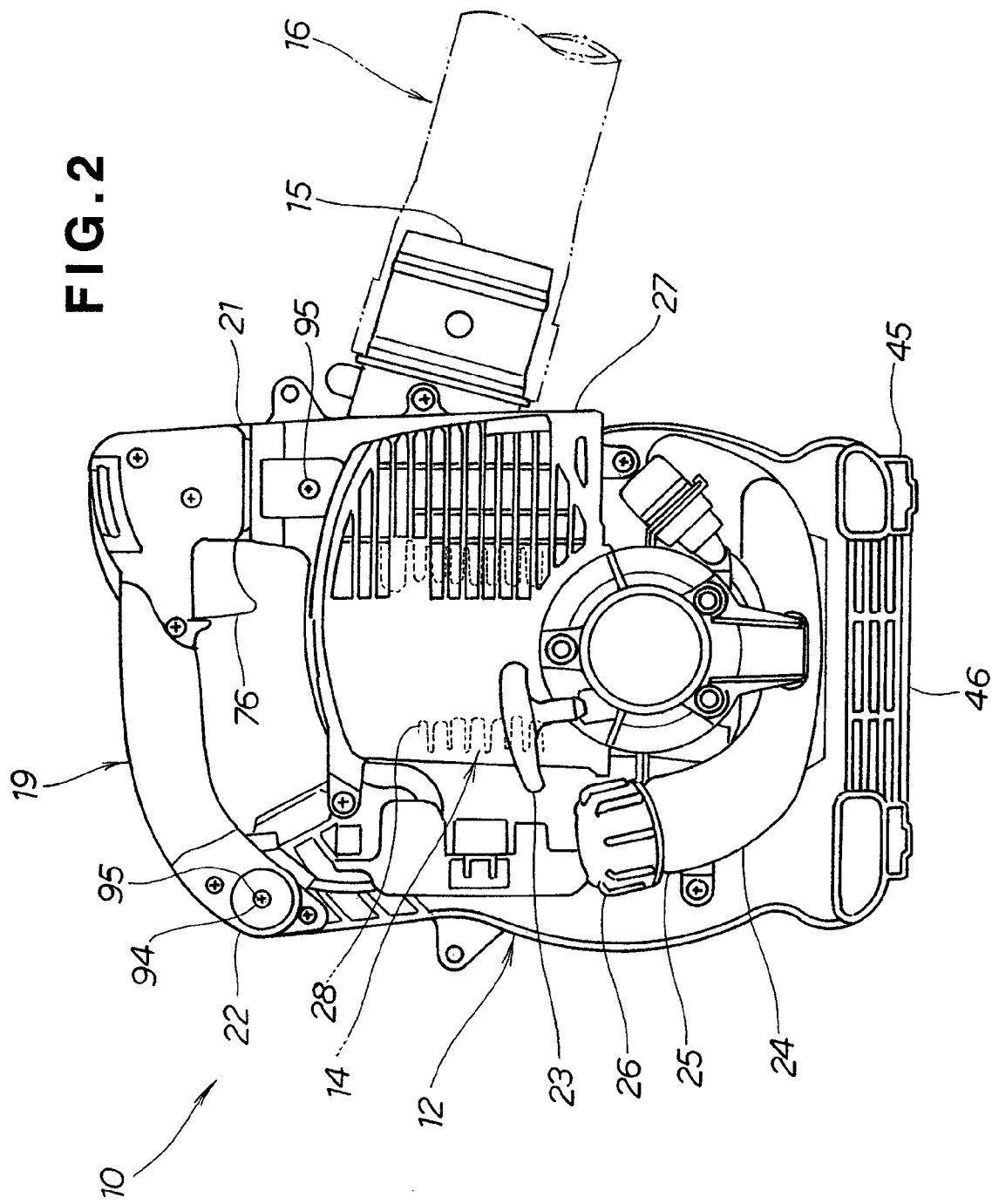
FIG. 2 is a right side view of the power blower of the present invention.

FIG. 2 is a right side view of the power blower 10 with the discharge duct 16 removed for clarity. In the instant embodiment, the drive source 14 is a general-purpose engine, which includes a recoil starter knob 23 operable by the human operator to activate the drive source 14, a fuel tank 24 for holding fuel to be supplied to the drive source 14, a cap 26 for covering a fill opening 25 of the fuel tank 24, a cover 27 covering the drive source 14 (i.e., engine cover), and a cylinder block 28 in which a piston reciprocates.

Figure 3:
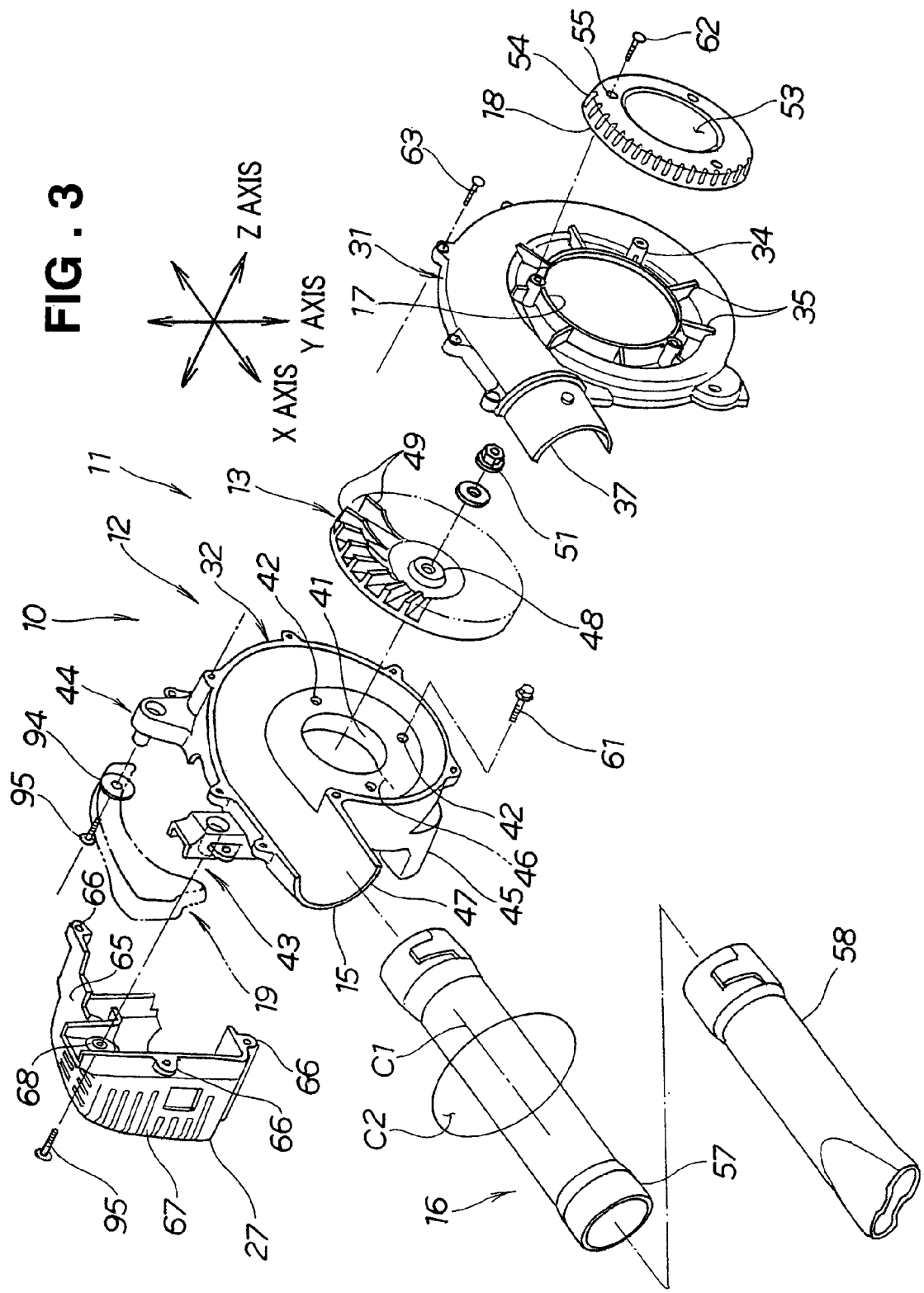
FIG. 3 is an exploded perspective view of a blowing section in the power blower of the present invention.

FIG. 3 is an exploded perspective view of the blowing section 11 of the power blower 10, which is composed of the fan housing 12, blowing fan 13 and fan cover 18 as noted above and primarily functions to increase air pressure.

The fan housing 12 comprises a left housing section 31 to which the fan cover 18 is secured, and a right housing section 32 to which the drive source (engine) 14 (FIG. 1) is secured.

The left housing section 31 has the air suction opening 17, a plurality of bosses 34 for mounting thereon the fan cover 18, a plurality of reinforcing ribs 35 for abutting engagement with the fan cover 18 as necessary, and a left-side discharging end portion 37 forming a left half of the discharge opening 15.

The right housing section 32 has an insertion opening 41 facing the drive source 14 (FIG. 1), a plurality of mounting portions 42 for attachment, of the drive source 14, to the housing section 32, front and rear support portions 43 and 44 for supporting the operating handle 19, a stand 45 for allowing the blowing section 11 to be stably held upright on the ground, floor or the like, an auxiliary handle 46 formed integrally with the stand 45, and a right-side discharging end portion 47 forming the remaining part of the discharge opening 15.

The blowing fan 13 includes a shaft section 48 for connection to the drive source 14 (FIG. 1), and a plurality of radial vanes 49 formed on the shaft section 48. Reference numeral 51 represents a nut for securing the blowing fan 13 to a predetermined portion of the drive source 14.

The fan cover 18 has a body 53 generally in the shape of a tray and functions to prevent foreign matters from entering the interior of the blowing section 11, and the body 53 has a plurality of air inlets 54 and mounting holes 55.

The discharge duct 16 comprises a rear duct portion 57 for attachment to the discharge opening 15, and a front duct portion 58 for end-to-end attachment to the rear duct portion 57.

Reference numeral 61 located generally in the center of FIG. 3 represents a bolt for securing the drive source 14 to the right housing section 32, 62 represents a screw for securing the fan cover 18 to the left fan housing section 31, and 63 a screw for securely combining together the left and right fan housing sections 31 and 32.

The drive source cover (engine cover) 27 includes a body 65 having flanges 66 for attachment to the right housing section 32. The cover body 65 also has ventilating openings 67, and a retainer (retaining member or portion) 68 provided on an upper portion thereof for preventing accidental detachment of the vibration damping member 85; the retainer 68 is so shaped as to not interfere with the operating handle 19.

Figure 4:
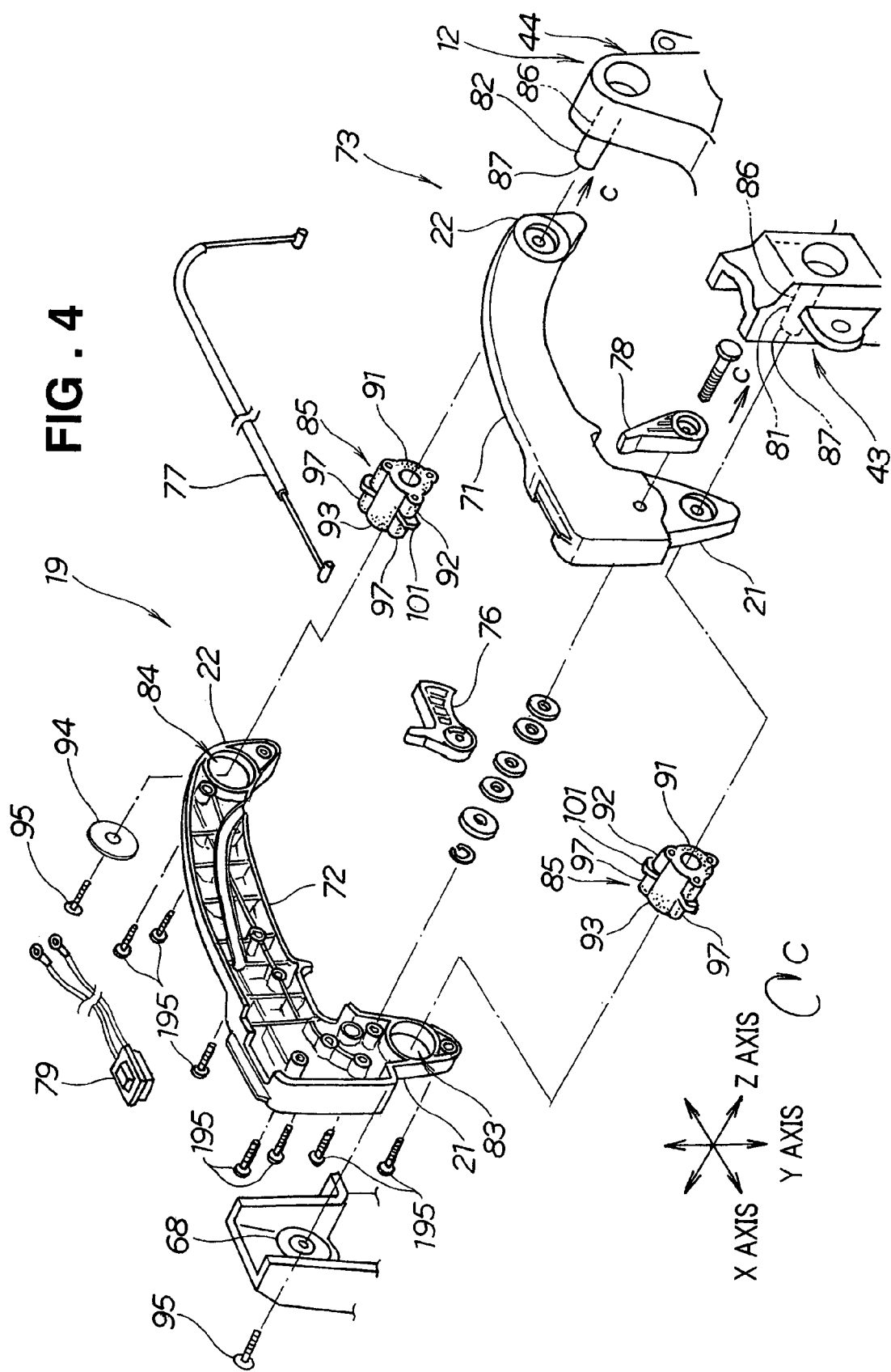
FIG. 4 is an exploded perspective view of an operating handle in the power blower of the present invention.

FIG. 4 is an exploded perspective view of the operating handle 19 of the power blower 10; reference character C appearing in a lower section of the figure represents a direction of pivotal movement around the Z axis.

The operating handle 19 comprises left and right handle halves 71 and 72 and is fixed on the fan housing 12 via the three-direction vibration damping mechanism 73 that resiliently supports the operating handle 19 as will be detailed.

The operating handle 19 also includes an operation section, which includes a throttle lever 76, a throttle wire 77 connected to the throttle lever 76, a throttle holding lever 78 attached to the left and right handle halves 71 and 72 for holding the throttle lever 76 in a desired operating position, and a start switch 79 mounted on the handle 19 for activating or deactivating the drive source 14.

The three-direction vibration damping mechanism 73 includes first and second shaft sections 81 and 82 provided on the fan housing 12, first and second cylindrical mounting sections 83 and 84 formed on the front and rear handle portions 21 and 22, respectively, and two, front and rear, resilient vibration damping members 85 each interposed between one of the first and second cylindrical mounting sections 83 or 84 and one of the first and second shaft sections 81 or 82 and having a plurality of (three in the illustrated example) generally-mountain-shaped protruding portions 97 (see also FIG. 5) for resilient contact with an inner peripheral surface of the first or second cylindrical mounting section 83 or 84.

The three-direction vibration damping mechanism 73 is described below in greater detail. The vibration damping mechanism 73 includes the above-mentioned front and rear support portions 43 and 44 formed on the fan housing 12 (specifically, the right housing section 32) and projecting upwardly from the general upper surface of the housing 12, and the first and second shaft sections 81 and 82 formed on and projecting from respective one surfaces of the support portions 43 and 44. For description purposes, the proximal end of each of the shaft sections 81 and 82 is indicated by reference numeral 86. The vibration damping mechanism 73 also includes the resilient vibration damping members 85 provided in corresponding relation to the first and second shaft sections 81 and 82 and first and second cylindrical mounting sections 83 and 84, and each of the damping members 85 is fitted over the corresponding shaft portion 81 or 82 from the other or distal end 87 of the shaft portion 81 or 82 (i.e., in a direction of arrow c) in such a manner that its one end surface 91 is abutted against a stepped surface 88 (FIG. 6 or 11) of the corresponding shaft portion 81 or 82.

The vibration damping mechanism 73 further includes the first and second cylindrical mounting sections 83 and 84 each formed on the operating handle 19 so as to fit over an outer peripheral surface 92 of the corresponding vibration damping member 85 without interfering with the corresponding shaft section 81 or 82 (i.e., only over a range where the mounting section 83 or 84 does not interfere with the corresponding shaft section 81 or 82), and the retainers 68 and 94 attached to the respective distal or other ends 87 of the shaft sections 81 and 82 so as to engage with the other end surfaces 93 of the vibration damping members 85. Screws 95 fasten the retainers 68 and 94 to the first and second shaft sections 81 and 82, and screws 195 fasten together the left and right handle halves 71 and 72.

FIG. 5 is a lower perspective view of one of the vibration damping members 85. Note that the two (i.e., front and rear) vibration damping members 85 are identical in construction to each other, and thus the construction of only one of them is explained here. The vibration damping member 85 has the generally-mountain-shaped protruding portions 97 formed, on the outer periphery of a cylindrical base portion 96, at equal circumferential pitches P. Resiliently-adjusting hole 98 is formed in each of the protruding portions 97 substantially concentrically with a central axis C3 of the protruding portion 97. Rotational-movement-preventing projecting portion 101 of a substantial rectangular shape is formed generally on a substantial axial middle region of each of the protruding portions 97. In attaching or assembling the operating handle 19 to the fan housing 12, one of the generally-mountain-shaped protruding portions 97 is positioned in the Y-axis (i.e., vertical) direction; such a vertically-positioned protruding portion is indicated by "97v" for convenience of explanation. Each of the resilient vibration damping members 85 is made of rubber of any desired specific characteristics.

Figure 6:
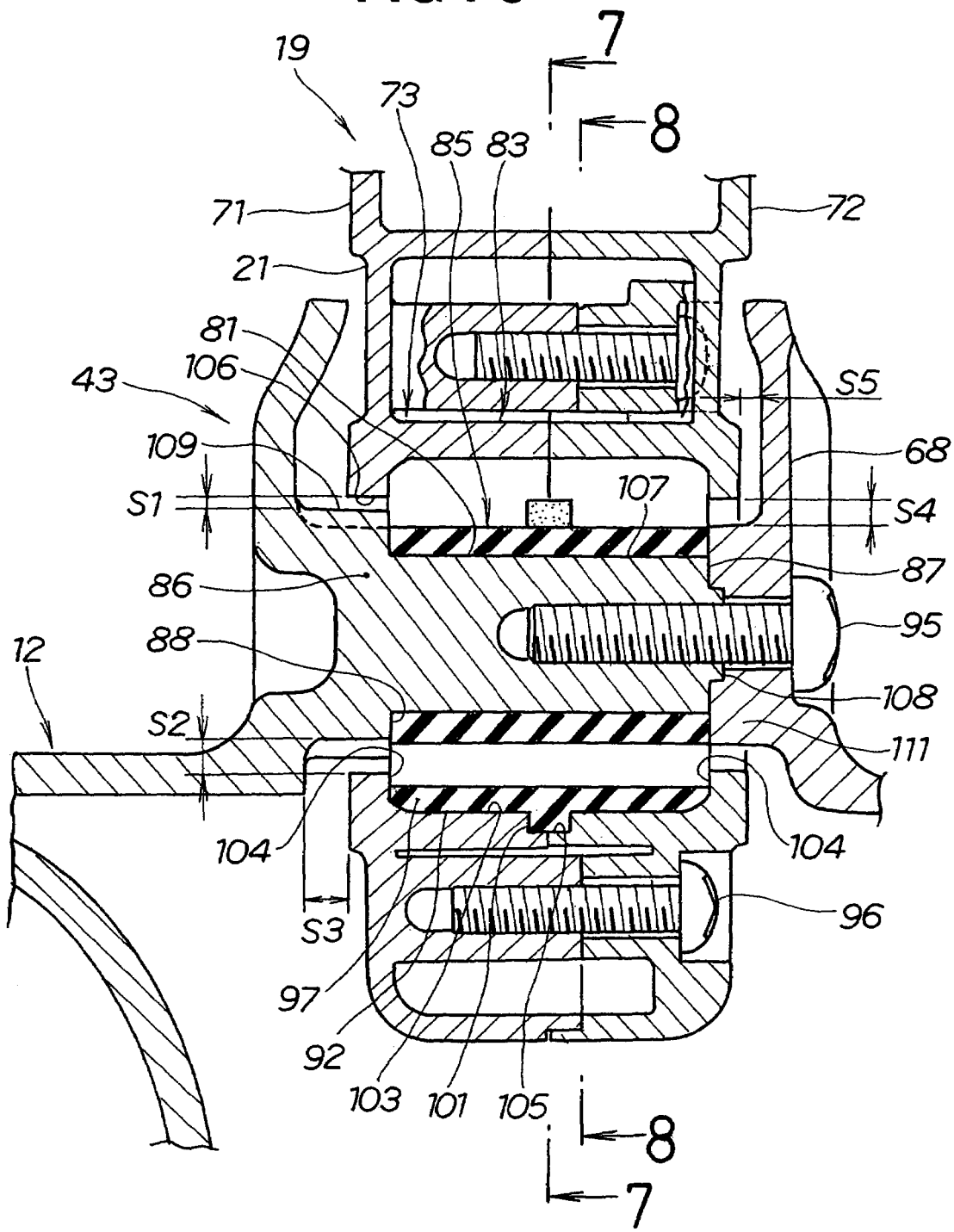
FIG. 6 is a sectional view taken along the 6—6 line of FIG. 1.

FIG. 6 is a sectional view taken along the 6—6 line of FIG. 1, which particularly shows in section a front section of the vibration damping mechanism (i.e., front vibration damping mechanism section) 73 which is provided on the front portion 21 of the operating handle 19.

The vibration damping member (i.e., front vibration damping member) 85 is interposed snugly between the first shaft section 81 and the first cylindrical mounting section 83 formed at a front end portion (front handle portion 21) of the operating handle 19.

The first cylindrical mounting section 83 is formed to fit over the outer peripheral surface 92 of the vibration damping member 85 without interfering with the first shaft section 81 (i.e., only over a range where the mounting section 83 does not interfere with the shaft section 81). Specifically, the first cylindrical mounting section 83 has: an inner circumferential portion 103; a pair of opposed inner end portions 104 extending continuously from the inner circumferential portion 103; three recessed portions 105 formed in the inner circumferential portion 103 at equal circumferential pitches P (see FIG. 7) and fitting with the rotational-movement-preventing projecting portions 101 of the vibration damping member 85; and three pivotal-movement-preventing recessed portions 106 formed in each of the inner end portions 104 at equal circumferential pitches. Further, in the first cylindrical mounting section 83, there are provided moving allowances S1–S3 by means of which the first cylindrical mounting section 83 is movable or displaceable relative to the first shaft section 81, as well as moving allowances S4 and S5 by means of which the first cylindrical mounting section 83 is movable or displaceable relative to the retainer 68.

The first shaft section 81 has a body 107 projecting from the front support portion 43, and the stepped surface 88 is formed in the body 107 near the one or proximal end 86 of the shaft body 107. The other or distal end 87 of the body 107 has a positioning boss 108, and three pivotal-movement-preventing projecting portions 109 are formed on the one end 86 at equal circumferential pitches.

Namely, in the front section of the three-direction vibration damping mechanism 73 provided on the front portion 21 of the operating handle 19, the vibration damping member 85 (specifically, generally-mountain-shaped protruding portions 97), fixed in place between the stepped surface 88 and retainer 68, is held by the inner circumferential portion 103 and opposed inner end portions 104 of the mounting section 83 Thus, the front section of the three-direction vibration damping mechanism 73 can effectively absorb the vibrations in the left-and-right or Z-axis direction, utilizing the moving allowances such as the ones S3 and S5, without the vibration damping member 85 itself being undesirably displaced due to the vibrations in the left-and-right or Z-axis direction.

Figure 7:
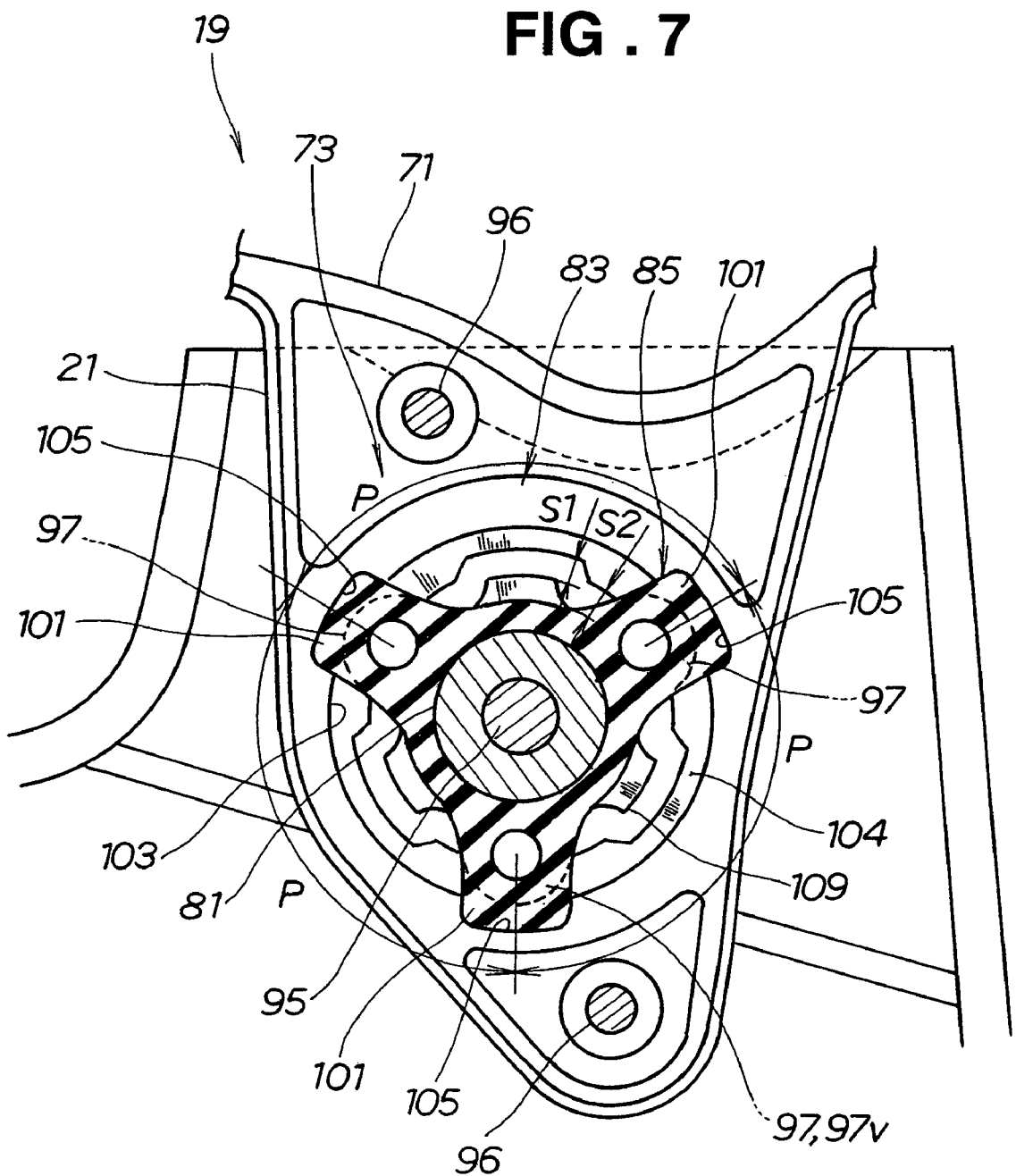
FIG. 7 is a sectional view taken along the 7—7 line of FIG. 6.

FIG. 7 is a sectional view taken along the 7—7 line of FIG. 6, which particularly shows in section the left handle half 71 and the vibration damping member 85 attached to the first cylindrical mounting section 83 on the front portion 21 of the operating handle 19.

The three rotational-movement-preventing projecting portions 101 of the vibration damping member 85 are fitted in the three recessed portions 105 of the first cylindrical mounting section 83. Such fitting engagement between the projecting portions 101 and the recessed portions 105 can prevent the damping member 85 from rotating around the Z axis (i.e., direction "C") and allows the mountain-shaped protruding portion 97v to be constantly fixed in the vertical direction.

Further, with radial interference between the three pivotal-movement-preventing recessed portions 106 and the three pivotal-movement-preventing projecting portions 109, the front section of the three-direction vibration damping mechanism 73 can also prevent more than necessary displacement and pivotal movement of the handle.

Figure 8:
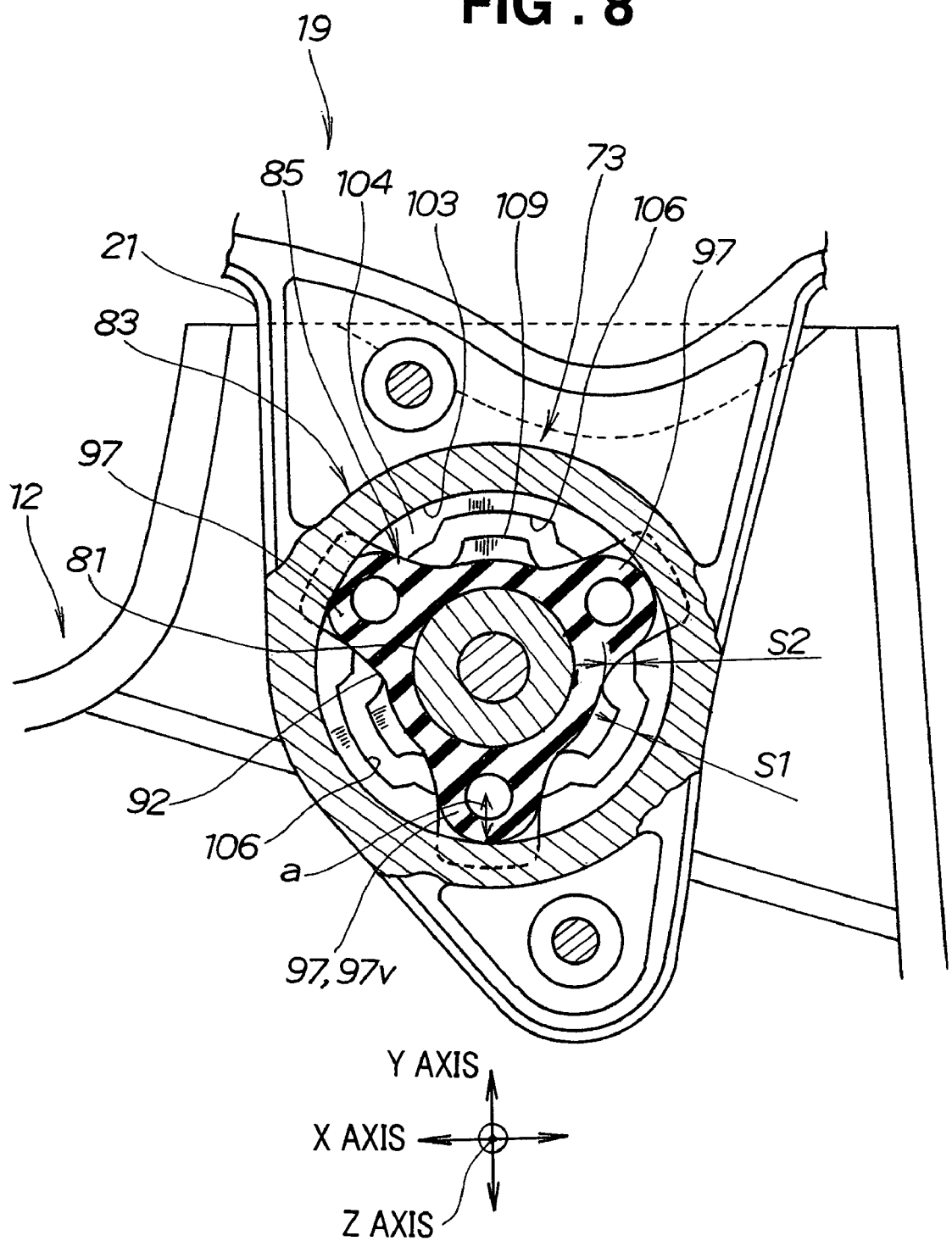
FIG. 8 is a sectional view taken along the 8—8 line of FIG. 6.

FIG. 8 is a sectional view taken along the 8—8 line of FIG. 6. As shown, the three mountain-shaped protruding portions 97 of the vibration damping member 85 resiliently contacts the first cylindrical mounting section 83 formed on the operating handle 19.

Namely, with the first cylindrical mounting section 83 abutting against the protruding portions 97 of the vibration damping member 85, the front section of the three-direction vibration damping mechanism 73, provided on the front handle portion 21, can absorb vibrations in the vertical (Y-axis) direction, front-and-rear (X-axis) direction, left-and-right (Z-axis) direction and oblique directions (e.g., 2-o'clock direction between the X and Y axes), passing from the drive source 14 (FIG. 1) and blowing fan 13 (FIG. 1) to the fan housing 12 and first shaft section 81, primarily owing to resilient deformation of the mountain-shaped protruding portions 97 of the damping member 85.

Also, because one of the protruding portions 97 (97v) is positioned in the vertical-axis (i.e., Y-axis) direction, the front section of the three-direction vibrating vibration damping mechanism 73 can absorb, via the vertically-positioned protruding portion 97v and utilizing the moving allowances such as the ones S1 and S2, vibrations in the vertical (Y-axis) direction passing from the drive source 14 (FIG. 1) and blowing fan 13 (FIG. 1) to the fan housing 12 and first shaft section 81 as indicated by arrow a. The front section of the three-direction vibrating vibration damping mechanism 73 can also absorb, via the other protruding portions 97, vibrations in the other directions (particularly in the front-and-rear (X-axis) direction). Further, because the damping member 85 is held by the stepped surface 88 of FIG. 6, the front section of the three-direction vibrating vibration damping mechanism 73 can effectively absorb the left-and-right (Z-axis direction) vibrations, utilizing the moving allowances such as the ones S3 and S5, without the vibration damping member 85 itself being undesirably displaced due to the vibrations in the left-and-right or Z-axis direction. In this way, vibrations passing to the operating handle 19 can be effectively suppressed.

Namely, the front section of the three-direction vibrating vibration damping mechanism 73 can effectively absorb vibrations in all of the three, X-, Y- and Z-axis, directions and thereby minimize the vibrations passing to the handle 19 with a simple construction.

Figure 9:
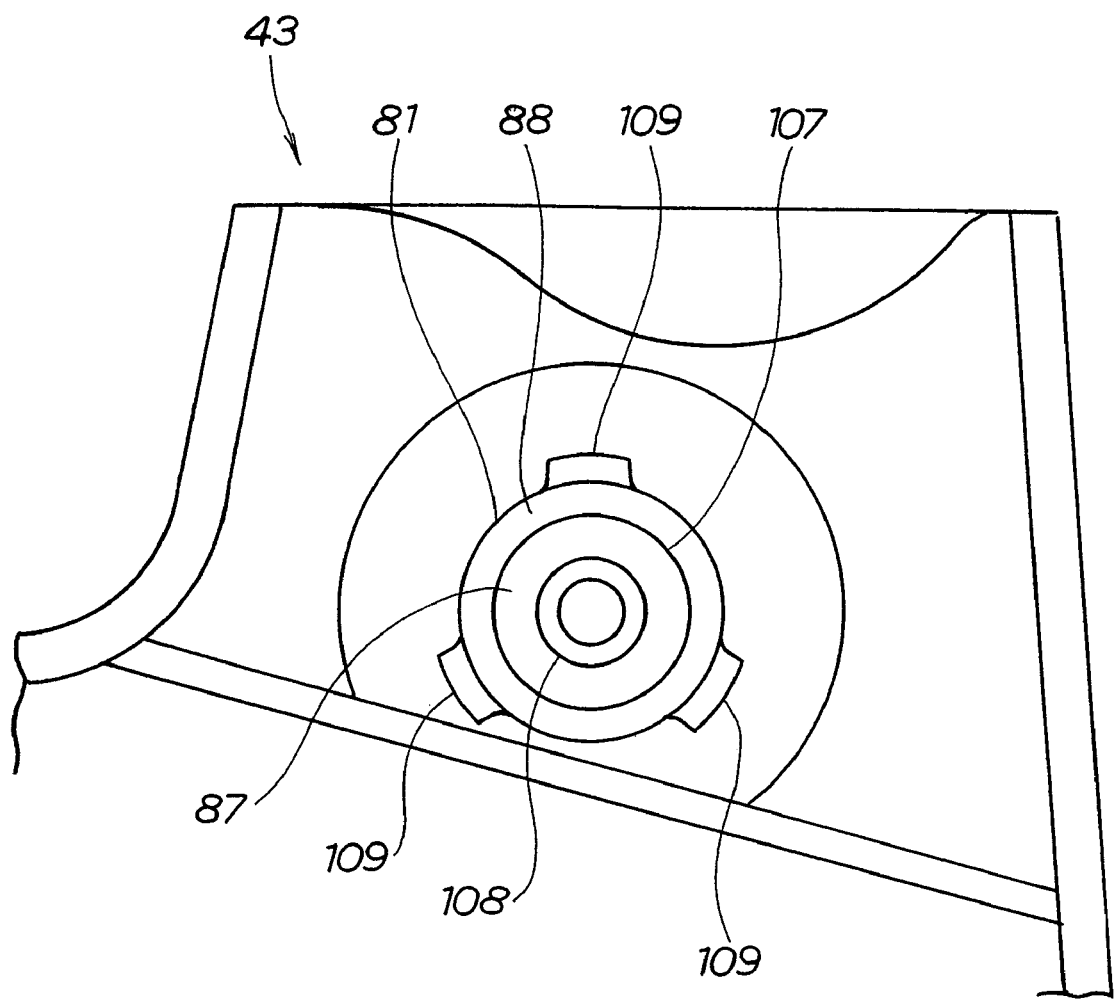
FIG. 9 is a right side view of a first shaft section formed on a fan housing of the power blower of the present invention.

FIG. 9 is a right side view of the first shaft section 81 provided on the fan housing 12 of the power blower 10. As noted earlier, the first shaft section 81, projecting from the front support portion 43, has the stepped surface 88, the positioning boss 108 formed on the other or distal end 87 of the shaft body 107, and the three pivotal-movement-preventing projecting portions 109 formed on the one end 86 at equal circumferential pitches.

Figure 10:
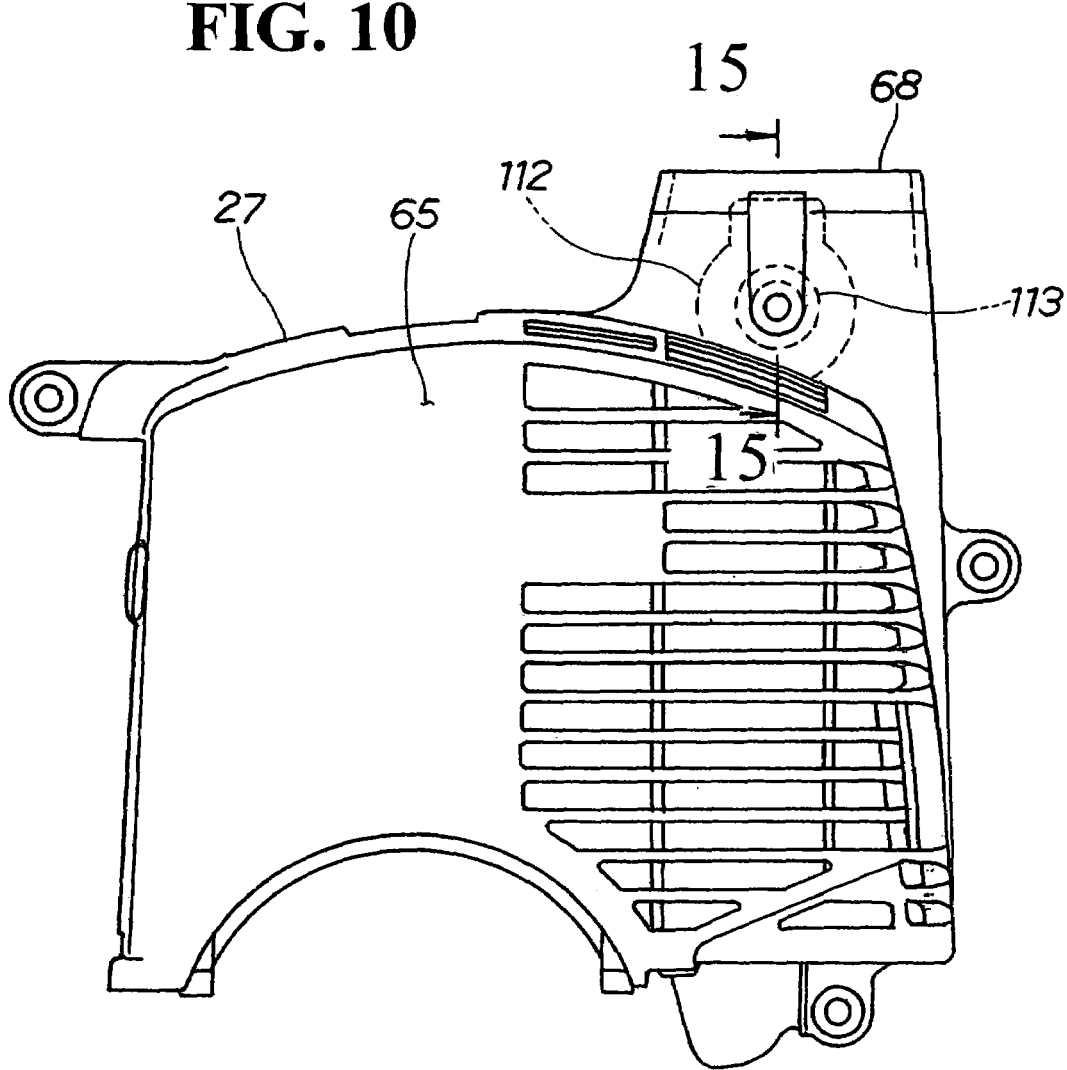
FIGS. 10 and 15 are views explanatory of a retaining member for the damping member in the power blower of the present invention, where
Figure 15:
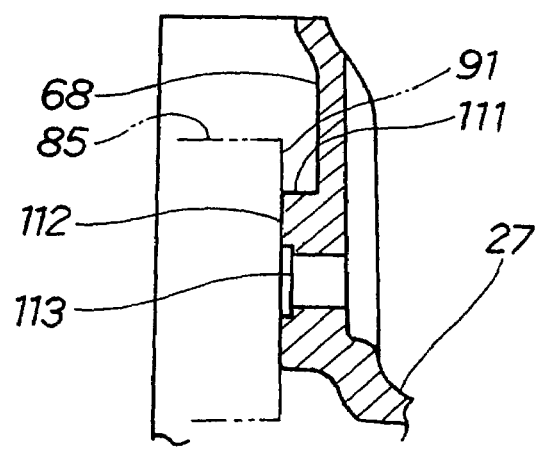

FIGS. 10 and 15 are views explanatory of the retainer 68 for the damping member 85 in the power blower 10. More specifically, FIG. 10 is a front view of the drive source cover 27, where the retainer 68 is formed or provided on an upper portion of the cover body 65.

FIG. 15 is a sectional view taken along the 15—15 line of FIG. 10. As shown, the retainer 68 has a cylindrical portion 111 of such an outer diameter as to not interfere with the inner end portion 104 (FIG. 6) of the handle's first cylindrical mounting section 83. The cylindrical portion 111 has a surface 112 abutting against the one end surface 91 of the vibration damping member 85, and the positioning boss 108 of the first shaft section 81 (FIG. 6) is fitted in a fitting hole 113 formed in the abutting surface 112.

Figure 11:
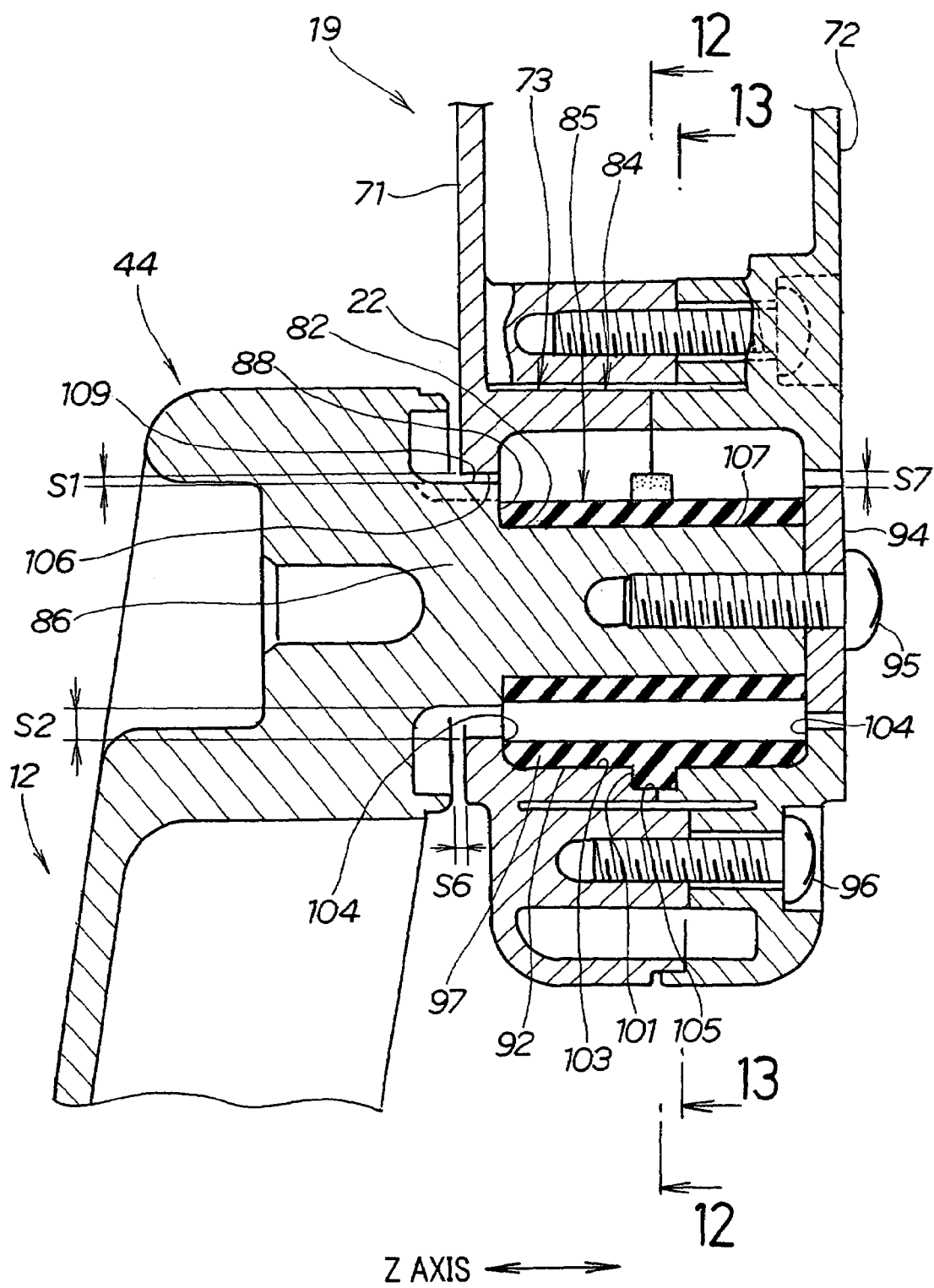
FIG. 11 is a sectional view taken along the 11—11 line of FIG. 1.

FIG. 11 is a sectional view taken along the 11—11 line of FIG. 1, which particularly shows in section a rear section of the vibration damping mechanism 73 (i.e., rear vibration damping mechanism section) provided on the rear portion 22 of the operating handle 19. The rear section of the three-direction vibration damping mechanism 73 is similar in construction to the above-described front section of the three-direction vibration damping mechanism 73, and the same elements as in the front vibration damping mechanism section 73 are indicated by the same reference characters as in FIGS. 6–9 and will not be described in detail to avoid unnecessary duplication.

As seen in FIG. 11, the resilient vibration damping member (rear vibration damping member) 85 is interposed between the second shaft section 82 and the second cylindrical mounting section 84 formed at a rear end portion (rear handle portion 22) of the operating handle 19.

Similarly to the first cylindrical mounting section 83, the second cylindrical mounting section 84 is formed to fit over the outer peripheral surface 92 of the vibration damping member 85 without physically interfering with the second shaft section 82. The second cylindrical mounting section 84 has three fitting recessed portions 105 and pivotal-movement-preventing recessed portions 106. Also, there are provided moving allowances S1, S2 and S6 by means of which the second cylindrical mounting section 84 is movable or displaceable relative to the second shaft section 82, as well as a moving allowance S7 by means of which the second cylindrical mounting section 84 is movable relative to the retainer 94.

The second shaft section 82 projects from the rear support portion 44, a shaft body 107, and a stepped surface 88. The second shaft section 82 also has three pivotal-movement-preventing projecting portions 109 on one end 86 at equal circumferential pitches. The retainer 94 is preferably in the form of a disk.

In this manner, the rear section of the three-direction vibration damping mechanism 73 achieves advantageous effects similar to those attained by the front section of the vibration damping mechanism 73. Namely, the rear section of the vibration damping mechanism 73 can effectively absorb vibrations in the left-and-right (Z-axis) direction, utilizing the moving allowance S6.

Figure 12:
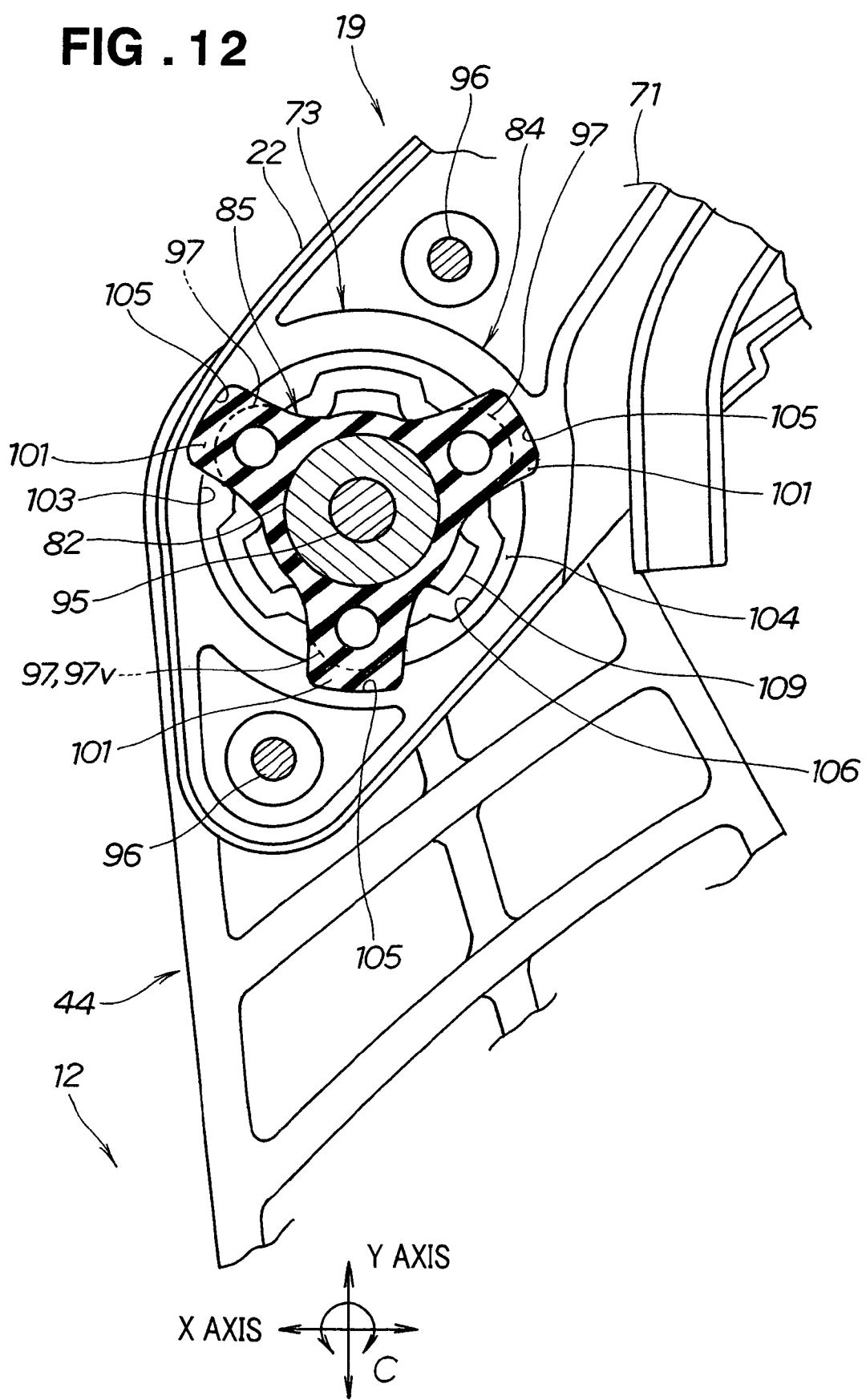
FIG. 12 is a sectional view taken along the 12—12 line of FIG. 11.

FIG. 12 is a sectional view taken along the 12—12 line of FIG. 11, which particularly shows in section the left handle half 71 and the vibration damping member 85 attached to the second cylindrical mounting section 84 on the rear portion 22 of the handle 19.

The three rotational-movement-preventing projecting portions 101 of the vibration damping member 85 are fitted in the three recessed portions 105, so that the damping member 85 can be prevented from rotating around the Z axis (i.e., in a direction "C") and allows the mountain-shaped protruding portion 97v to be constantly fixed in the vertical direction.

Figure 13:
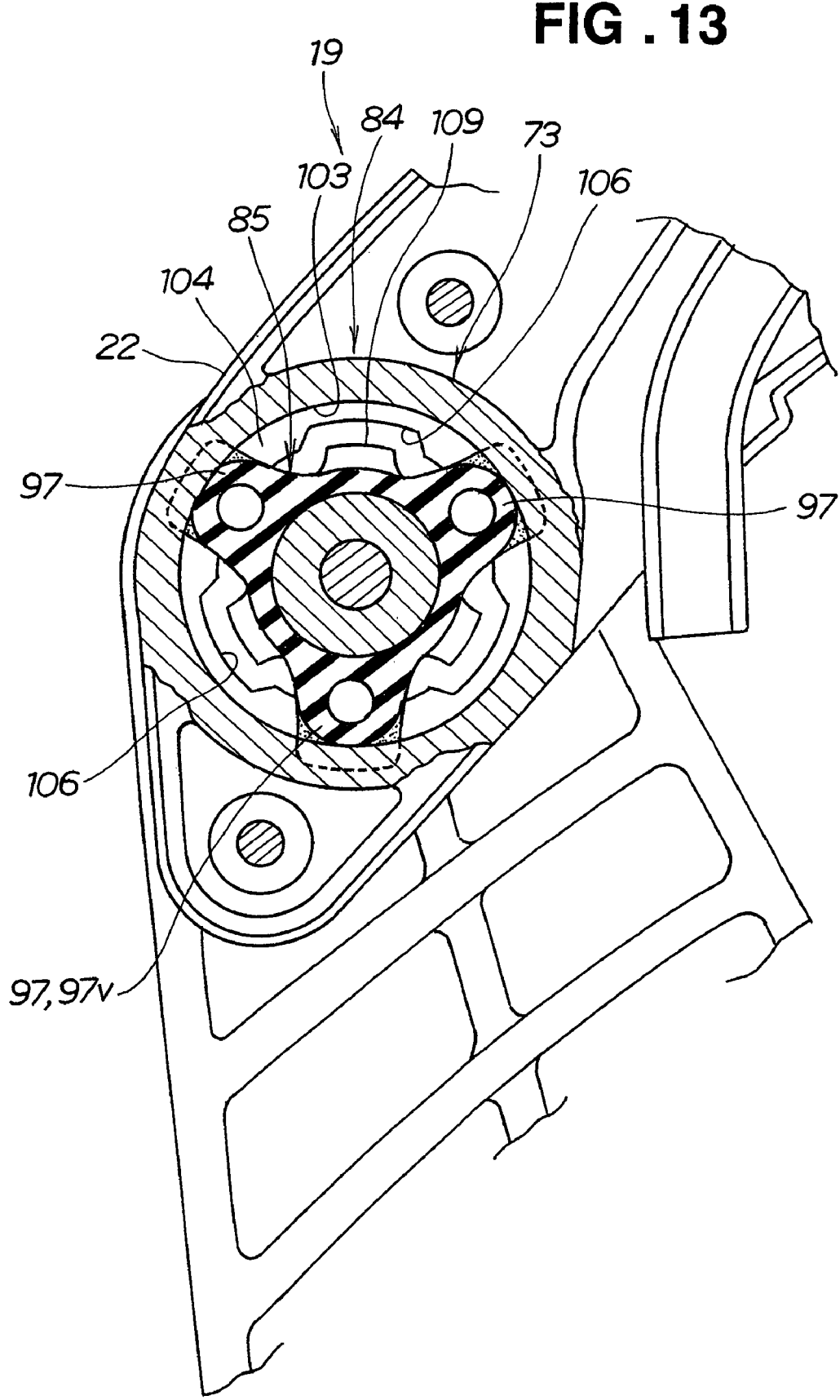
FIG. 13 is a sectional view taken along the 13—13 line of FIG. 11.

FIG. 13 is a sectional view taken along the 13—13 line of FIG. 11. As shown, the three mountain-shaped protruding portions 97 of the vibration damping member 85 resiliently contact the second cylindrical mounting section 84 formed on the operating handle 19.

Namely, with the second cylindrical mounting section 84 abutting against the protruding portions 97 of the vibration damping member 85, the rear section of the vibration damping mechanism 73, provided on the rear handle portion 22, can absorb vibrations passing from the second shaft section 82.

Namely, the rear section of the vibration damping mechanism 73 can absorb vibrations in the three directions, i.e. in the vertical (Y-axis) direction, front-and-rear (X-axis) direction and left-and-right (Z-axis) direction. As a consequence, the rear section of the vibration damping mechanism 73 can advantageously minimize the vibrations passing to the operating handle 19, with a simple structure.

Figure 14:
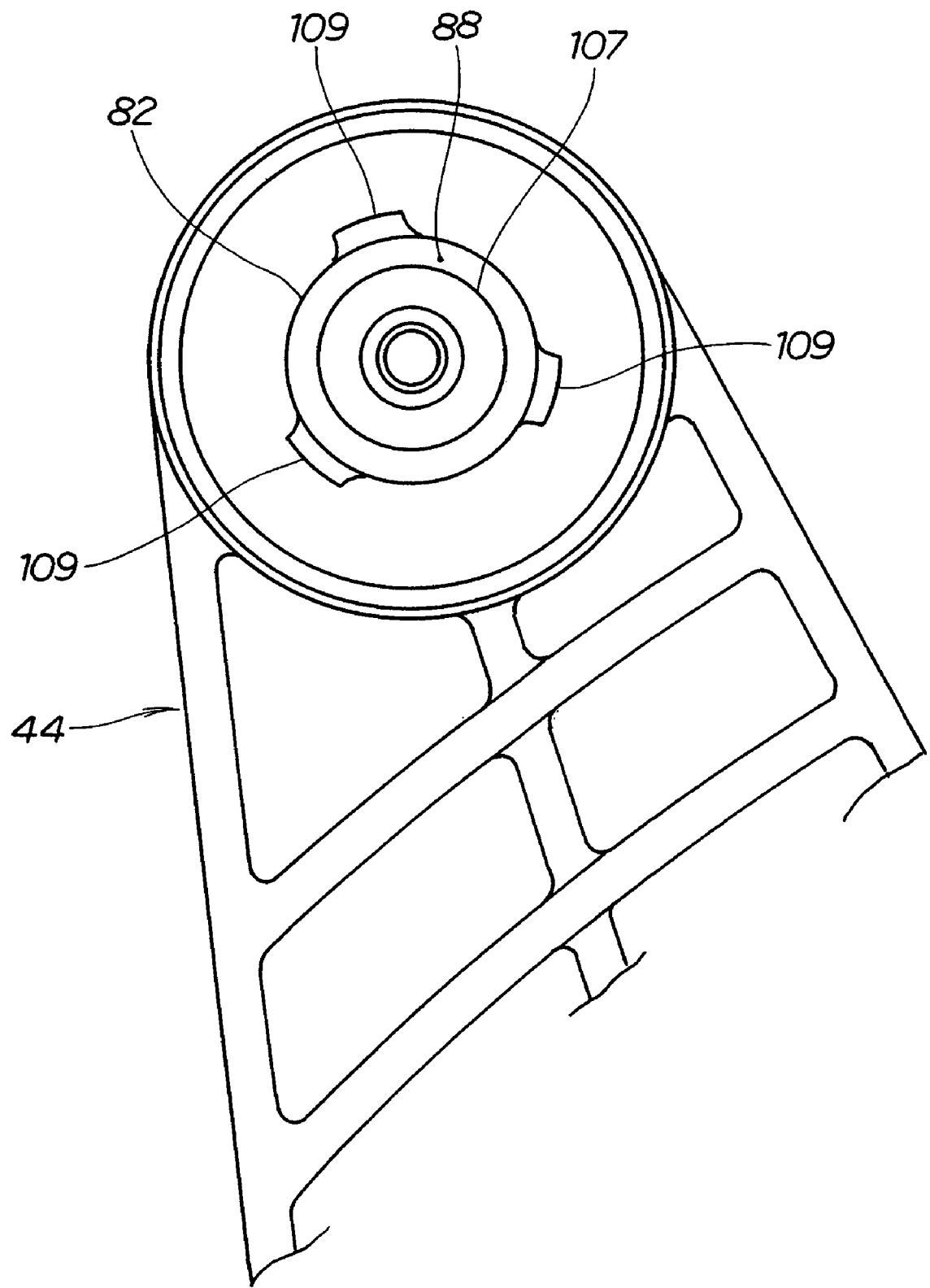
FIG. 14 is a right side view of a second shaft section formed on the fan housing of the power blower of the present invention.

FIG. 14 is a right side view of the second shaft section 82 provided on the fan housing 12 of the power blower 10. Similarly to the first shaft section 81, the second shaft section 82 projects from the rear support portion 44 and has the stepped surface 88 formed in the shaft body 107. The second shaft section 82 also has the three pivotal-movement-preventing projecting portions 109 on the one end 86 at equal circumferential pitches.

In the present invention, assembly, to the fan housing 12, of the operating handle 19 is carried out as follows. First, the front and rear vibration damping members 85 of the damping mechanisms 73 are attached to the operating handle 19 as illustrated in FIG. 4, and then the handle 19 with the damping members 85 attached thereto are fitted over the first and second shaft sections 81 and 82 of the fan housing 12 in one direction (i.e., direction of arrow c). Finally, the drive source cover 27, retainer 94 and various fastener members are secured to the first and second shaft sections 81 and 82. Namely, the handle 19 with the damping members 85 attached thereto can be fixed on the fan housing 12 by just being fitted over the first and second shaft sections 81 and 82 of the fan housing 12 in one direction. Thus, according to the present invention the assembly, to the fan housing 12, of the operating handle 19 can be carried out with increased ease and efficiency.

Figure 16:
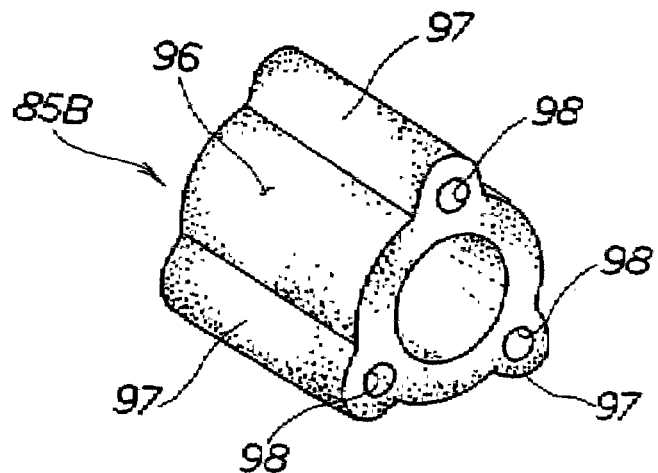
FIGS. 16–18 are views showing modified embodiments of the vibration damping member in the power blower of the present invention.
Figure 17:
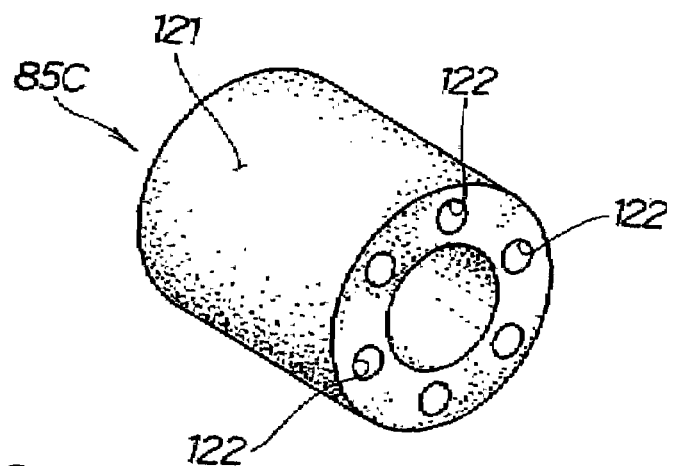
Figure 18:
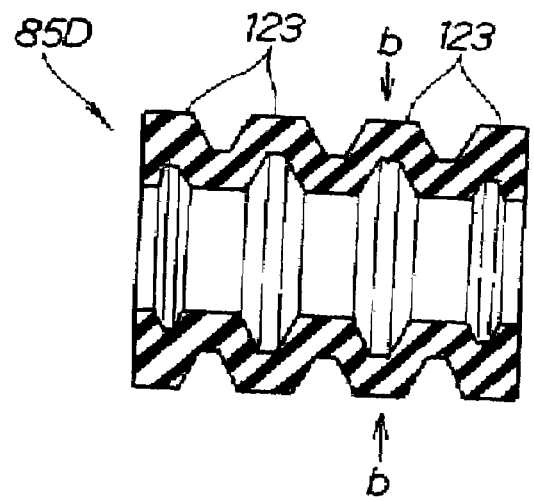
Figure 19:
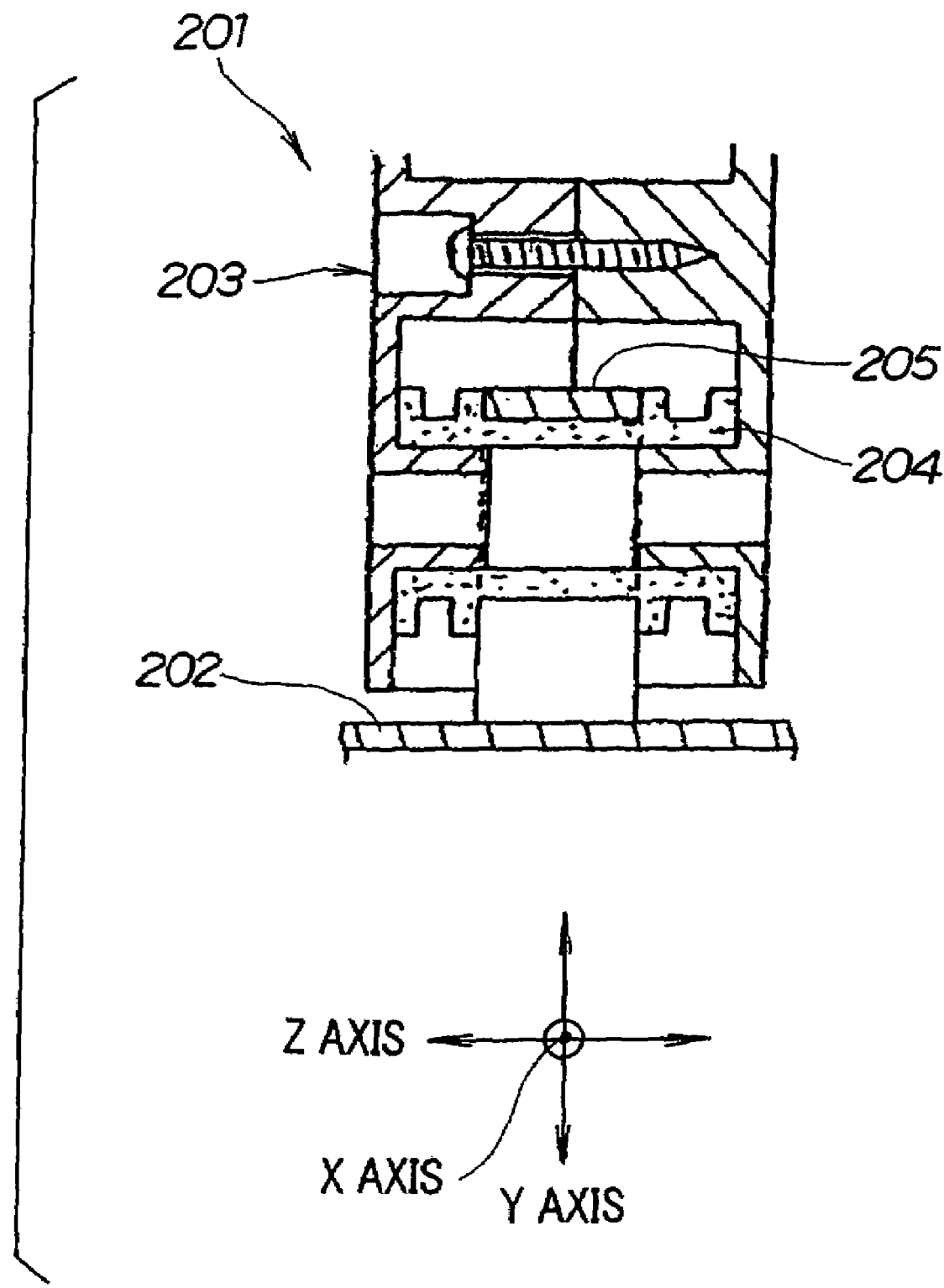
FIG. 19 is a sectional view schematically showing a vibration damping structure employed in a conventional portable air blower.

FIGS. 16–18 are views showing modified embodiments of the vibration damping member 85. The same elements as in the embodiment of FIG. 5 are indicated by the same reference characters as in the figure.

FIG. 16 shows a modified vibration damping member 85B which is characterized in that no rotational-movement-preventing projecting portion 101 (FIG. 5) is formed on the protruding portions 97. Thus, the modified vibration damping member 85B has a simpler shape, so that the molds for forming the left and right handle halves 71 and 72 and damping member 85B can be simplified.

FIG. 17 shows another modified vibration damping member 85C which is characterized in that no mountain-shaped protruding portion 97 is formed, and in that a plurality of through-holes 122 are formed in a cylindrical body 121 so as to change characteristics of the damping member 85C responsive to vibrations. Further, with no mountain-shaped protruding portion 97 formed, the modified vibration damping member 85C has an even simpler shape, so that the mold for forming the damping member 85C can be simplified further.

FIG. 18 is a sectional view of still another modified vibration damping member 85D which has a plurality of mountain-shaped protruding portions 123 formed like bellows. The mountain-shaped protruding portions 123 are resiliently deformable radially inward (i.e., in a direction of arrow b) to absorb vibrations. With this vibration damping member 85D, adjustment of the vibration-absorbing characteristics is facilitated.

Note that the vibration damping mechanism employed in the present invention can be suitably used in various other equipment than power blowers, such as mowers, grass cutters, etc.

Obviously, various minor changes and modifications of the present invention are possible in the light of the above teaching. It is therefore to be understood that within the scope of the appended claims the invention may be practiced otherwise than as specifically described.

What is claimed is:

1. A power blower comprising:
 a fan housing;
 a blowing fan accommodated in the fan housing;
 a drive source for driving the blowing fan;
 an operating handle connected to the fan housing for gripping by an operator of the power blower; and
 at least one vibration damping member interposed between the operating handle and the fan housing, the vibration damping member having a plurality of resiliently deformable protruding portions contacting an inner peripheral surface of the operating handle so that vibrations in three directions, passing from the drive source and blowing fan to the fan housing, are absorbed by resilient deformation of the protruding portions to thereby suppress vibrations passing via the fan housing to the operating handle.

2. A power blower as claimed in claim 1; further comprising a vibration damping mechanism comprising
a support portion provided on and projecting from a surface of the fan housing;
a shaft section projecting from a surface of the support portion;
the vibration damping member being fitted over the shaft section and having one end surface abutting against a stepped surface formed in the shaft section;
a mounting section provided on the operating handle and fitting over an outer peripheral surface of the vibration damping member without interfering with the shaft section; and
a retainer member provided at a distal end of the shaft section for holding another end surface of the vibration damping member.

3. A power blower as claimed in claim 1; further comprising an air discharge duct attached to an air discharge opening formed in the fan housing for discharging air from the interior of the fan housing; and wherein the vibration damping member resiliently supports the operating handle in such a manner so as to permit displacement of the operating handle with respect to the fan housing in three mutually-perpendicular directions, namely, an axial direction of the air discharge duct and two directions perpendicular to the axial direction of the air discharge duct.

4. A power blower as claimed in claim 1; wherein the at least one vibration damping member comprises two vibration damping members.

5. A power blower as claimed in claim 4; wherein each of the vibration damping members has a plurality of projecting portions projecting from the respective protruding portions for preventing rotational movement of the vibration damping member.

6. A power blower as claimed in claim 1; wherein the vibration damping member has a plurality of projecting portions projecting from the respective protruding portions for preventing rotational movement of the vibration damping member.

7. A power blower comprising:
a fan housing having an air discharge duct attached to an air discharge opening formed therein;
a blowing fan accommodated in the fan housing;
a handle; and
a vibration damping mechanism via which the handle is fixed on the fan housing, the vibration damping mechanism resiliently supporting the handle in such a manner as to permit displacement of the handle with respect to the fan housing in three mutually-perpendicular directions consisting of an axial direction of the air discharge duct and two directions perpendicular to the axial direction of the air discharge duct;
wherein the vibration damping mechanism comprises a shaft section projecting from a surface of the fan housing, a cylindrical mounting section provided on the handle and located around an outer peripheral surface of the shaft section, and a resilient vibration damping member interposed between the cylindrical mounting section and the shaft section; and wherein the vibration damping member has a plurality of protruding portions contacting an inner peripheral surface of the cylindrical mounting section.

8. A power blower comprising:
a fan housing having a pair of shaft sections projecting from a surface thereof;
a blowing fan accommodated in the fan housing;
a drive source for driving the blowing fan;
an operating handle connected to the fan housing for gripping by an operator of the power blower, the operating handle having a pair of mounting sections disposed around respective outer peripheral surfaces of the shaft sections of the fan housing; and
a pair of vibration damping members interposed between the respective shaft sections of the fan housing and the mounting sections of the operating handle for absorbing vibrations in three mutually-perpendicular directions, passing from the drive source and blowing fan to the fan housing, so that vibrations passing via the fan housing to the operating handle are suppressed.

9. A power blower as claimed in claim 8; further comprising an air discharge duct attached to an air discharge opening formed in the fan housing for discharging air from the interior of the fan housing; and wherein the vibration damping members support the operating handle in such a manner so as to permit displacement of the operating handle with respect to the fan housing in the three mutually-perpendicular directions, namely, an axial direction of the air discharge duct and two directions perpendicular to the axial direction of the air discharge duct.

10. A power blower as claimed in claim 8; wherein each of the vibration damping members has a plurality of resiliently deformable protruding portions contacting an inner peripheral surface of the respective mounting section of the operating handle.

11. A power blower as claimed in claim 10; wherein each of the vibration damping members has a plurality of projecting portions projecting from the respective protruding portions for preventing rotational movement of the vibration damping member.

12. A power blower as claimed in claim 11; wherein each of the vibration damping members has a plurality of through-holes formed in the respective protruding portions for varying a damping characteristic of the vibration damping member.

13. A power blower as claimed in claim 10; wherein each of the vibration damping members has a plurality of through-holes formed in the respective protruding portions for varying a damping characteristic of the vibration damping member.

14. A power blower as claimed in claim 8; wherein each of the vibration damping members has a plurality of through-holes formed in a peripheral side surface the vibration damping member for varying a damping characteristic of the vibration damping member.

15. A power blower as claimed in claim 8; wherein each of the vibration damping members has a plurality of mountain-shaped protruding portions forming a bellows and being deformable radially inward of the damping member to absorb vibrations.

16. A power blower comprising:
a fan housing;
a blowing fan accommodated in the fan housing;
a drive source for driving the blowing fan;
an operating handle connected to the fan housing for gripping by an operator of the power blower; and
a vibration damping mechanism for absorbing vibrations in three directions passing from the drive source and blowing fan to the fan housing to thereby suppress vibrations passing via the fan housing to the operating handle, the vibration damping mechanism having first and second shaft sections provided on the fan housing, first and second mounting sections formed on the operating handle, and a pair of vibration damping members respectively interposed between the first mounting section and the first shaft section and between the second mounting section and the second shaft section.

17. A power blower according to claim 16; wherein the vibration damping members are fitted over the respective first and second shaft sections.

18. A power blower according to claim 16; wherein the first and second mounting sections are fitted over the respective outer peripheral surfaces of the vibration damping members.

19. A power blower according to claim 16; wherein the vibration damping mechanism has a pair of retainer members disposed at respective distal ends of the shaft sections for holding end surfaces of the vibration damping members.

20. A power blower according to claim 16; wherein each of the vibration damping members is made of a resilient material.

* * * * *